US011429362B2

(12) United States Patent
Buck et al.

(10) Patent No.: US 11,429,362 B2
(45) Date of Patent: Aug. 30, 2022

(54) DEVICE EXPERIENCE APPLICATION LAUNCHER

(71) Applicant: Dell Products L.P., Round Rock, TX (US)

(72) Inventors: Amy L. Buck, Discovery Bay, CA (US); Mainak Roy, Bangalore (IN); Rathi Babu, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/523,200

(22) Filed: Jul. 26, 2019

(65) Prior Publication Data

US 2021/0026625 A1   Jan. 28, 2021

(51) Int. Cl.
| *G06F 8/61* | (2018.01) |
| *G06F 8/71* | (2018.01) |
| *G06F 21/57* | (2013.01) |
| *G06F 21/44* | (2013.01) |
| *G06F 9/451* | (2018.01) |
| *G06F 8/38* | (2018.01) |
| *G06F 8/65* | (2018.01) |

(52) U.S. Cl.
CPC .............. *G06F 8/61* (2013.01); *G06F 8/71* (2013.01); *G06F 21/44* (2013.01); *G06F 21/57* (2013.01); *G06F 8/38* (2013.01); *G06F 8/65* (2013.01); *G06F 9/451* (2018.02)

(58) Field of Classification Search
CPC ........ G06F 8/60–71; G06F 8/38; G06F 9/451; G06F 21/57
USPC ................................ 717/120, 121, 168–178
See application file for complete search history.

(56) References Cited

U.S. PATENT DOCUMENTS

| 6,789,215 | B1 * | 9/2004 | Rupp | ........................ | G06F 8/61 |
| | | | | | 714/38.14 |
| 7,904,608 | B2 * | 3/2011 | Price | ........................ | G06F 8/65 |
| | | | | | 710/10 |
| 8,074,213 | B1 * | 12/2011 | Holtz | ........................ | G06F 8/65 |
| | | | | | 717/172 |
| 8,490,184 | B2 * | 7/2013 | Brinker | ................... | G06F 21/51 |
| | | | | | 717/126 |
| 9,953,143 | B2 * | 4/2018 | Yee | ........................ | G06F 21/105 |
| 2006/0026304 | A1 * | 2/2006 | Price | ........................ | G06F 8/65 |
| | | | | | 710/8 |

(Continued)

OTHER PUBLICATIONS

Application programming interface, Wikipedia, 2017, 9 pages, [retrieved on Jun. 7, 2022], Retrieved from the Internet: <URL:https://web.archive.org/web/20170304074603/https://en.wikipedia.org/wiki/Application_programming_interface>.*

(Continued)

*Primary Examiner* — Geoffrey R St Leger
(74) *Attorney, Agent, or Firm* — Terrile, Cannatti & Chambers, LLP; Emmanuel A. Rivera

(57) ABSTRACT

A system, method, and computer-readable medium are disclosed for improved management of software applications used on a device of a business entity. A determination is made if software applications are needed for the device. Application program interface (API) calls are performed for needed software applications from one or more sources, including third-party providers. The needed software applications are fetched from the one or more sources through communication channels established by the API calls; and authenticating fetched software applications prior to installing on the device.

20 Claims, 5 Drawing Sheets

(56) References Cited

U.S. PATENT DOCUMENTS

| | | | |
|---|---|---|---|
| 2006/0218528 A1* | 9/2006 | Lerner | G06F 8/60 |
| | | | 717/120 |
| 2008/0163199 A1* | 7/2008 | Rao | G06F 8/61 |
| | | | 717/177 |
| 2014/0108451 A1* | 4/2014 | Lee | G06Q 30/0601 |
| | | | 707/770 |
| 2014/0215029 A1* | 7/2014 | Terwilliger | H04M 1/0202 |
| | | | 709/220 |
| 2016/0234625 A1* | 8/2016 | Wang | H04L 67/06 |

OTHER PUBLICATIONS

Software deployment, Wikipedia, 2017, 6 pages, [retrieved on Jun. 7, 2022], Retrieved from the Internet: <URL:https://web.archive.org/web/20170507110726/https://en.wikipedia.org/wiki/Software_deployment>.*

* cited by examiner

DEVICE EXPERIENCE APPLICATION LAUNCHER

BACKGROUND OF THE INVENTION

Field of the Invention

The present invention relates to the management of information handling systems. More specifically, embodiments of the invention provide a system, method, and computer-readable medium for improved management of software applications used on devices of a business entity.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When a user downloads a software application for a device or information handling system, the software application can originate from various sources. Such sources can include the manufacturer or business entity that provides or controls the device. The business entity may provide the software; however, oftentimes a software application may originate or be provided by third party providers that may or may not be under the control of the business entity. The third-party software application providers can provide the software applications from various marketplaces (e.g., websites), such as Google®, Microsoft®, Apple® marketplaces. Software applications from third-party providers may sometimes be branded with unauthorized artwork not approved by the business entity.

Since the business entity may not have control of the distribution and use of software applications used on business entity systems and devices, this can lead to user uncertainty as to the legitimacy of software applications. Users view and download licensed and unlicensed software applications and cannot distinction between them. Furthermore, since there is no centralized control by the business entity there can be insufficient or incorrect documentation provided by the third-party providers. The business entity can receive calls/complaints/support requests from users that are implementing third-party software applications. Since there may be no traceability if a software application originates from a third-party provider, the business entity is unable to give proper assistance. At certain times, there may be documentation to be provided related to the software applications. If users rely on third-party providers for the software applications, there may be uncertainty as to whether the users will receive proper documentation.

Devices (i.e., information handling systems) can include "launchers" that are part of an operation system (OS) which enable/disable different software applications. Control is performed from the OS and the device side. Other launchers are provided as applications on the device. Such application-based launchers do not have the control to authenticate software applications of the business entity.

SUMMARY OF THE INVENTION

A system, method, and computer-readable medium are disclosed for improved management of software applications used on a device of a business entity comprising: determining if software applications are needed for the device; —performing application program interface (API) calls for needed software applications from one or more sources; fetching the needed software applications from the one or more sources through communication channels established by the API calls; and-authenticating fetched software applications prior to installing on the device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 is a generalized illustration of user device 202 that can be used to implement the system and method of the present invention as implemented in the system and method of the present invention;

DETAILED DESCRIPTION

A system, method, and computer-readable medium are disclosed for identification of sources of computer files or files. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
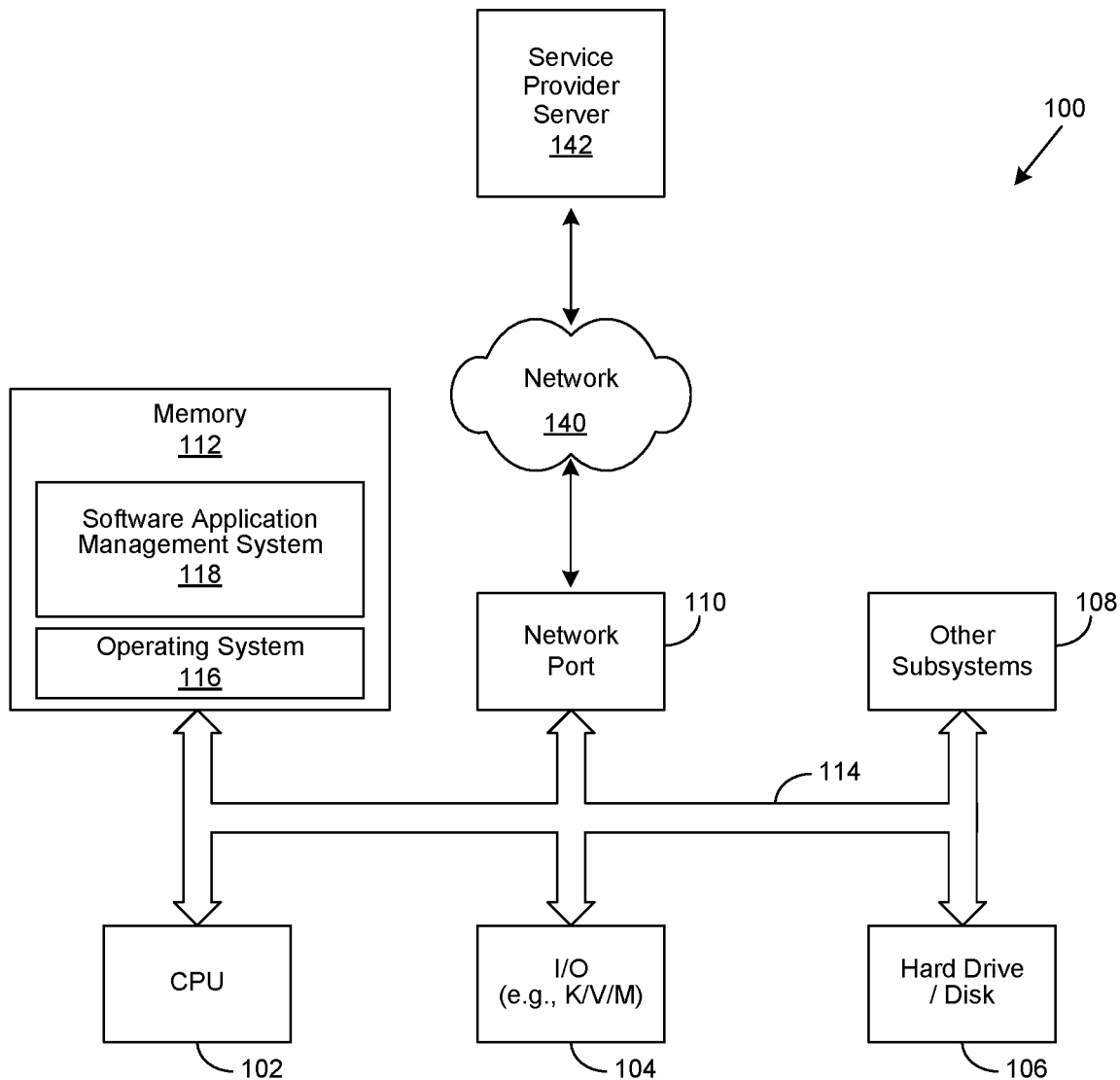
FIG. 1 is a general illustration of components of an information handling system.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also include a software application management system 118.

In particular, the software application management system 118 provides for centralized software application management and distribution to devices supported by a business entity. In certain embodiments, the software application management system 118 is configured to monitor and control software applications, and to provide related information such as documentation, website links, etc. In certain implementations, the software application management system 118 is provided as a service from the service provider server 142.

Figure 2:
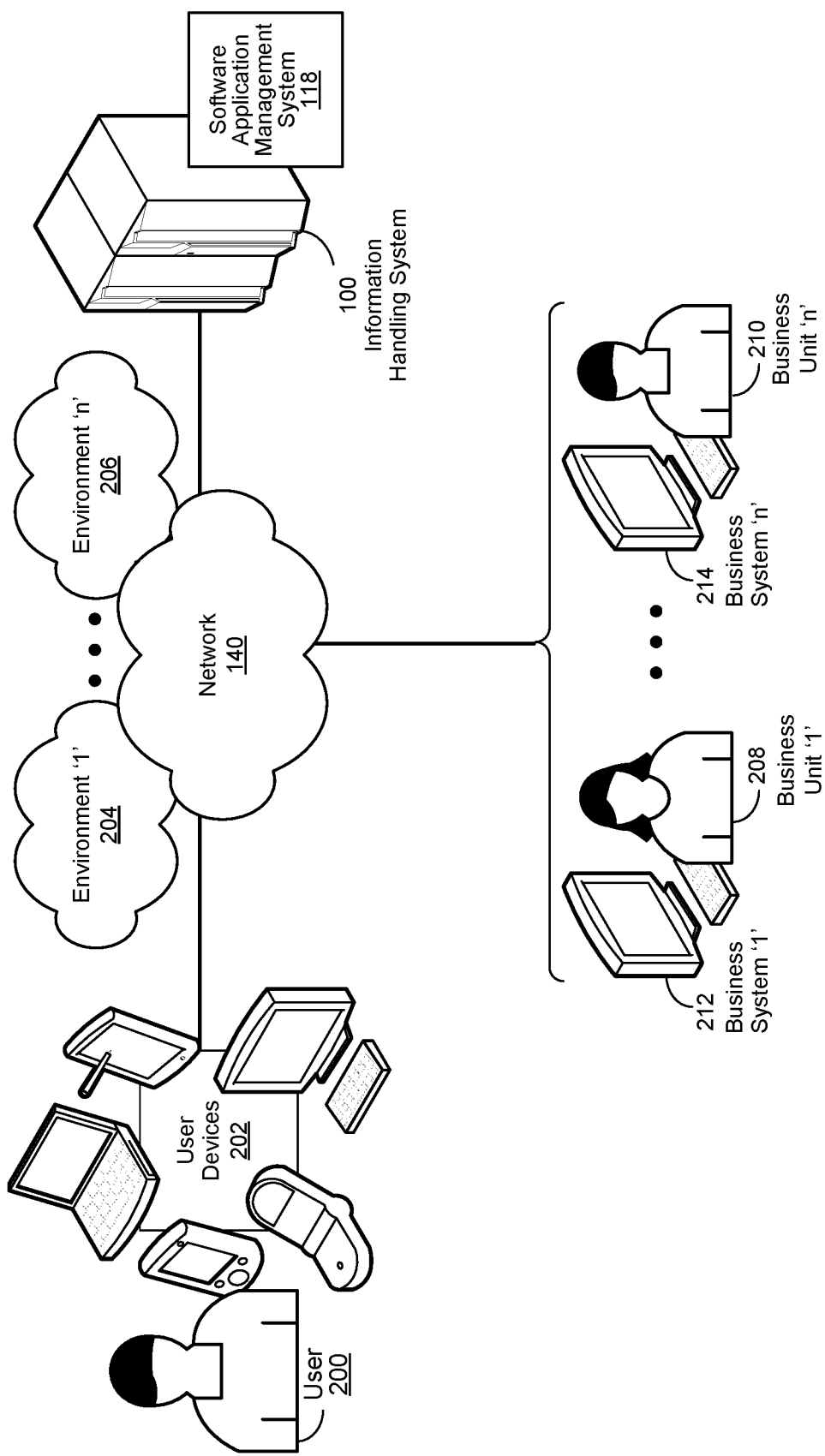
FIG. 2 is a simplified block diagram of a software application management system.

FIG. 2 is a simplified block diagram of software application management system 118 implemented in accordance with an embodiment of the invention to provide for management of software applications. In various embodiments, user 200 through user device(s) 202 can download software applications that are implemented on user devices 202. User 200 can be representative of multiple users, and user device(s) 202 are representative of multiple devices or information handling systems. User device(s) 202 are provided/managed by a business entity. The business entity can include different entities, and different functions as further discussed below. Software applications that are implemented on device(s) 202 are provided and supported by the business entity directly or through third-party vendors, marketplaces, websites, etc.

As used herein, user device(s) 202 refers to an information handling system such as a personal computer, a laptop computer, a tablet computer, a personal digital assistant (PDA), a smart phone, a mobile telephone, or other device that is capable of communicating and processing data. In certain implementations, user device(s) 202 representatives a user environment that includes various computing devices (e.g., servers), storage, software solutions, hardware (e.g., accessories), etc.

In various embodiments, the user device(s) 202 is used to exchange information between the information handling system 100 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

In certain implementations, the user device(s) 202 include components that are configured in hardware, firmware, software, etc. that are controlled by the business entity. In particular, the business entity provides software and software applications that support such components. In certain implementations, software applications are provided to support functions that used on the user device(s) 202. The software application management system 118 allows the business entity to manage software applications that are used on user device(s) 202.

User device(s) 202 are connected to network 140. Furthermore, network 140 can include environment '1' 204 through environment 'n' 206. Environment '1' 204 through environment 'n' 206 can include various marketplaces, sites, platforms, environments, etc., operated by third-party providers, which provide software applications to user device(s) 202, and particularly software applications controlled by the business entity. Environment '1' 204 through environment 'n' 206 can also include sites applicable to user device(s) 202, and software applications provided to and implemented on user device(s) 202. Examples of such sites can include podcasts, webinars, technical videos, access to documentation, links for related purchases, etc. In certain implementations, user 200 is provided links or access when software applications are accessed and/or downloaded onto user device(s) 202. For example, a link to a technical video, documentation, webinar, etc. can be provided to assist the user 200 regarding use or implementation of the software application(s).

In certain implementations, the user 200 can interact with one or more business units, as represented by business unit '1'' 208 through business unit 'n' 210. Communication by business unit 1" 208 through business unit 'n' 210 can be through network 140 through respective business system '1' 212 through business system 'n' 214. In certain implementations, by business unit 1" 208 through business unit 'n' 210 can be administrators of the software application management system 118.

In certain implementations, the business unit 1" 208 through business unit 'n' 210 can include product support or customer support units, such as information technology (IT) administrators, that assist user 200. For example, a product support unit can provide software application updates, documentations, links for help, etc. to user 200. In certain implementations, the product support unit or IT group can track or monitor software applications, such as software applications provided by third-party providers. Business unit 1" 208 through business unit 'n' 210 can include marketing, product development, sales, etc. which can be any business unit/entity that has a relationship or interest with user device 202, components of user device 202, and the software applications that are provided to user device 202.

Figure 3:
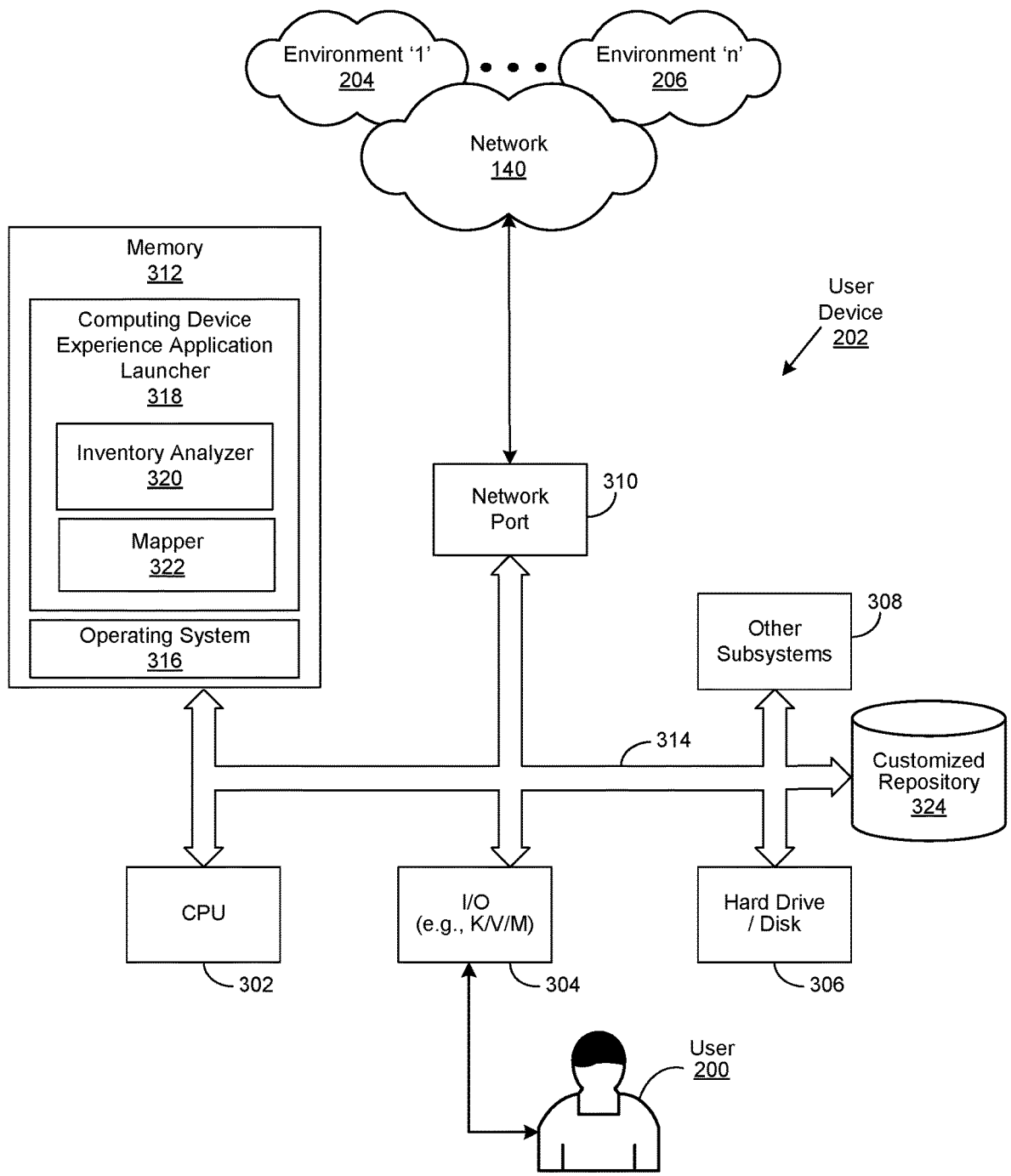
FIG. 3 is a simplified block diagram of a user device that implements management of software applications used on the user device.

FIG. 3 is a generalized illustration of user device 202 that can be used to implement the system and method of the present invention. The user device 202 includes a processor (e.g., central processor unit or "CPU") 302, input/output (I/O) devices 304, such as a microphone, a keyboard, a video/display, a mouse, and associated controllers (e.g., K/V/M), a hard drive or disk storage 306, and various other subsystems 308. User 200 can interact with the user device through I/O devices 304.

In various embodiments, the user device 202 also includes network port 310 operable to connect to the network 140. As discussed, the network 140 can include environment '1' 204 through environment 'n' 206. I/O devices 304 can include various USB and connected local sources (e.g., SD cards, scanners, digital cameras, etc.).

The user device 202 likewise includes system memory 312, which is interconnected to the foregoing via one or more buses 314. System memory 312 can further include operating system (OS) 316.

In certain embodiments, the memory 312 includes a device experience application launcher or DEAL 318. In certain implementations, the DEAL 318 can be OS, platform, and device independent application that is installed on (extracted onto) a system, such as user device 202. The DEAL 318 can act as an application program interface (API) gateway. Since the communication protocol of the DEAL 318 is API driven, there can be fewer compatibility issues across platforms and sources.

In certain implementations, the DEAL 318 acts as a gateway to environment '1' 204 through environment 'n' 206, and particularly to marketplaces that provide software applications to user device 202. In certain implementations, the DEAL 318 determines the type(s) of software application that can be downloaded or received from certain marketplaces. For example, only signed software applications are received from certain marketplaces; only licensed software applications are received from certain marketplaces; and for certain marketplaces signed and licensed software applications can be received. In certain implementations, based on a particular system or user device 202 configuration or environment, the DEAL 318 provides a customized bundle of software applications. A configuration or environment of a system or user device 202, can include various computing devices, such as servers, storage, hardware, client software, software solutions, software applications, etc.

In certain implementations, the DEAL 318 communicates with network 140 to the information handling system 100 and particularly to software application management system 118 described above in FIGS. 1 and 2. The software application management system 118 can provide updates to and monitor DEAL 318, allowing for notification and auto updates of software applications, including bundled software applications. This can ensure that the system or user device 202 is up to date with software applications. Furthermore, DEAL 318 can assure that the software applications are authenticate. As discussed, DEAL 318 can also be configured to access sites or retrieve information related to software applications that may be product specific. In certain implementations, the DEAL 318 can be configured to generate reports as to the system or user device 202 that allows users 200 and/or administrators (e.g. business unit 1" 208 through business unit 'n' 210 of FIG. 2) to analyze and make decisions as to the user device 202 and its product lines.

In certain embodiments, the DEAL 318 includes an inventory analyzer 320 and a mapper 322. In an embodiment, the inventory analyzer 320 is configured to analyze inventory of components and software applications of the system or user device 202 regardless of the platform or environment of the system or user device 202. Inventory can include components implemented in hardware, firmware, software, etc. Software applications can include resident software applications and downloaded/downloadable software applications.

In certain implementations, the inventory analyzer 320 is configured to identify business entity specific components, hardware, software, applications, etc. of the system or user device 202. Identification can be by part numbers as specified by the business entity. In certain implementations, the inventory analyzer 320 includes a database of part numbers of such components, hardware, software, applications, etc. When the components, hardware, software, applications, etc. are identified, the inventory analyzer 320 can generate a customized repository 324 that is specific to the system or user device 202. The customized repository 324 can be updated when changes take place on the system or user device. Such changes can include instances when a business entity component is added or removed and when software/software applications are installed or updated. After the customized repository 324 is generated, the DEAL 318 can identify relevant software applications that are used to support changes/updates to the customized repository 324. The DEAL 318 can be implemented to look for signature files and agreements in the software applications to ensure that software applications that are authorized by the business entity are downloaded and implemented.

Figure 4:
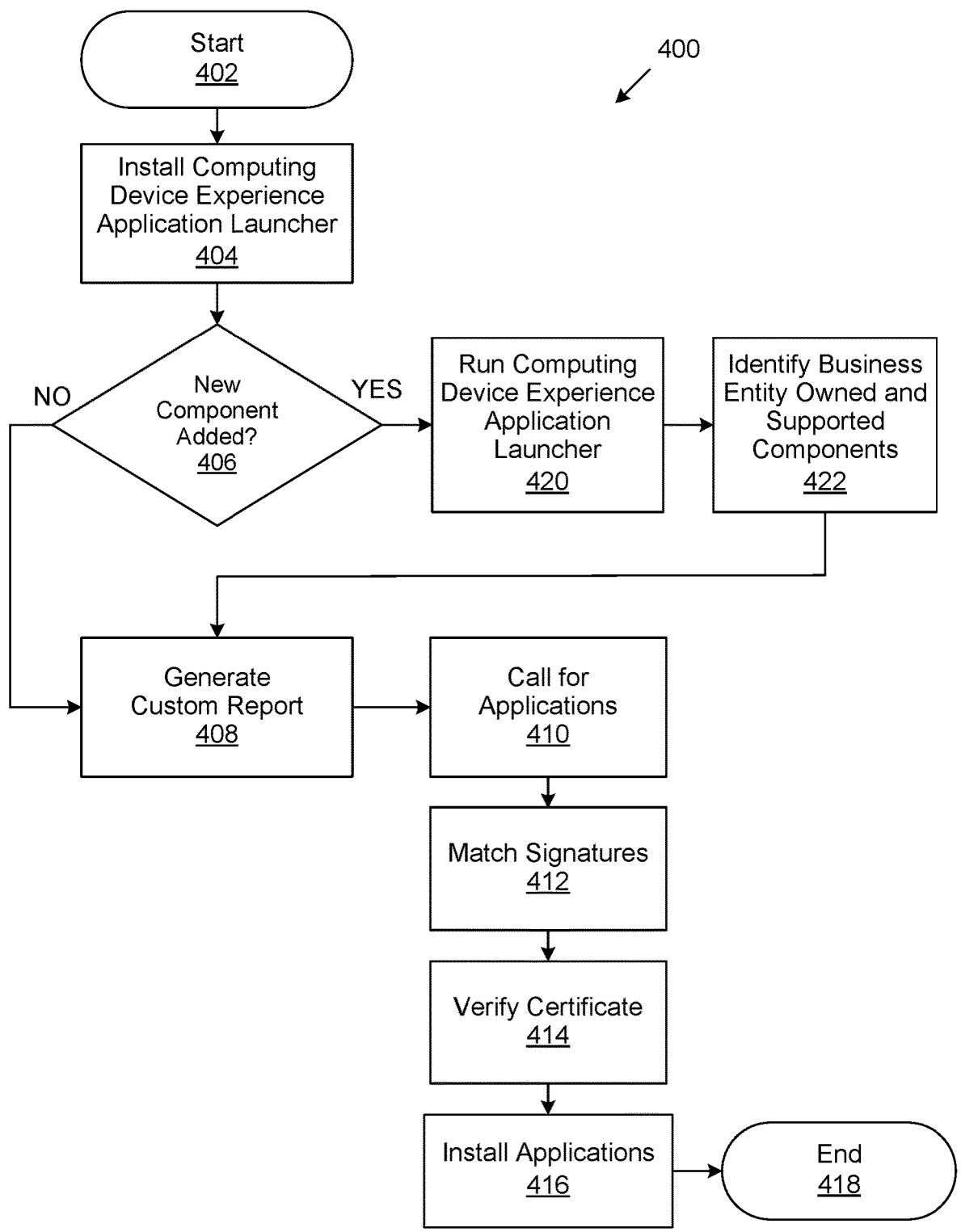
FIG. 4 is a general flowchart for operation of an inventory analyzer as implemented in the system and method of the present invention.

FIG. 4 is a generalized flowchart 400 as to operation of an inventory analyzer. In certain implementations, process 400 applies to inventory analyzer 320. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402 the process 400 starts. At step 404, DEAL 318 is installed on a system or device. In certain implementations, the DEAL 318 may already be installed or available on the system or device. If a new component is not added, then following the NO branch of block 406, at step 408 a custom report is generated. The custom report is specific to the system or device, and can include an inventory of components, hardware, software, applications, etc. resident on the system or device. In certain implementations, the custom report can be the described customized repository 324.

At step 410, a call is made for software applications for the system or device. In certain implementations, the call can be an API call for signed and certified software applications. Relevant software applications are fetched from various sources, including business entity sources and third-party software application sources. At step 412, signatures are matched for the software applications that are fetched. At step 414, certificates are viewed for the software applications that are fetched. Steps 412 and 414 are performed for authentication of the fetched software applications. For certain implementations, one or both steps 412 can be performed. At step 416, the software applications are installed on the system or device. At block 418, the process 400 ends.

If a new component is added, then following the YES branch of block 406, at step 420, the DEAL 318 is ran. At step 422, business entity owned and supported components, hardware, software, applications, etc. resident on the system or device are identified. The process 400 continues at step 408 and ending at block 418.

Referring back to FIG. 3, for certain implementations, in order to establish a communication protocol, once software applications are identified, the DEAL 318 can implement the mapper 322. In certain implementations, for the DEAL 318 to establish a real-time communication channel with the sources that provide software applications, the mapper 322 is implemented.

The mapper 322 can provide for the real-time communication channel, such at any given point of time, the system or user device 202 is updated with the latest versions of the software applications. The mapper 322 can initiate API calls through an API gateway, and can implement the use of various OS APIs, such Apple iOS®, Windows®, Open source APIs, etc. A direct communication protocol is established with the sources of the software applications, where such software applications have been identified by the inventory analyzer 320 and reside in the customized repository 324. In certain implementations, the mapper 322 stores identifier numbers, such as #KeyDatabase/#PartNumbers, for software applications which are signed by the business entity and can be available over different platforms.

Once the API call is established for a software application, the mapper 322 can be implemented to fetch that software application to the system or device. Updates to the software application can trigger another API call from the mapper 322 to get the latest available version of the software application.

In certain implementations, the mapper 322 can generate a review report for the customized repository 324. The review report can guide administrators and users (e.g., user 200) as to status and changes to the system or device over a period of time.

For certain implementations, when the software application is received by the system or device (e.g., user device 202), installation can take place, where the DEAL 318 provides a level of checking authenticity based on identifier numbers, such as #KeyDatabase/#PartNumbers. User 200 can decide on the installation. In certain implementations, the DEAL 318 can be implemented to self-execute and install the software applications. In certain implementations, an administrator or user 200 may be check the review report before installing a software application. The DEAL 318 assures the user 200 that software applications are authenticate over a point in time.

Figure 5:
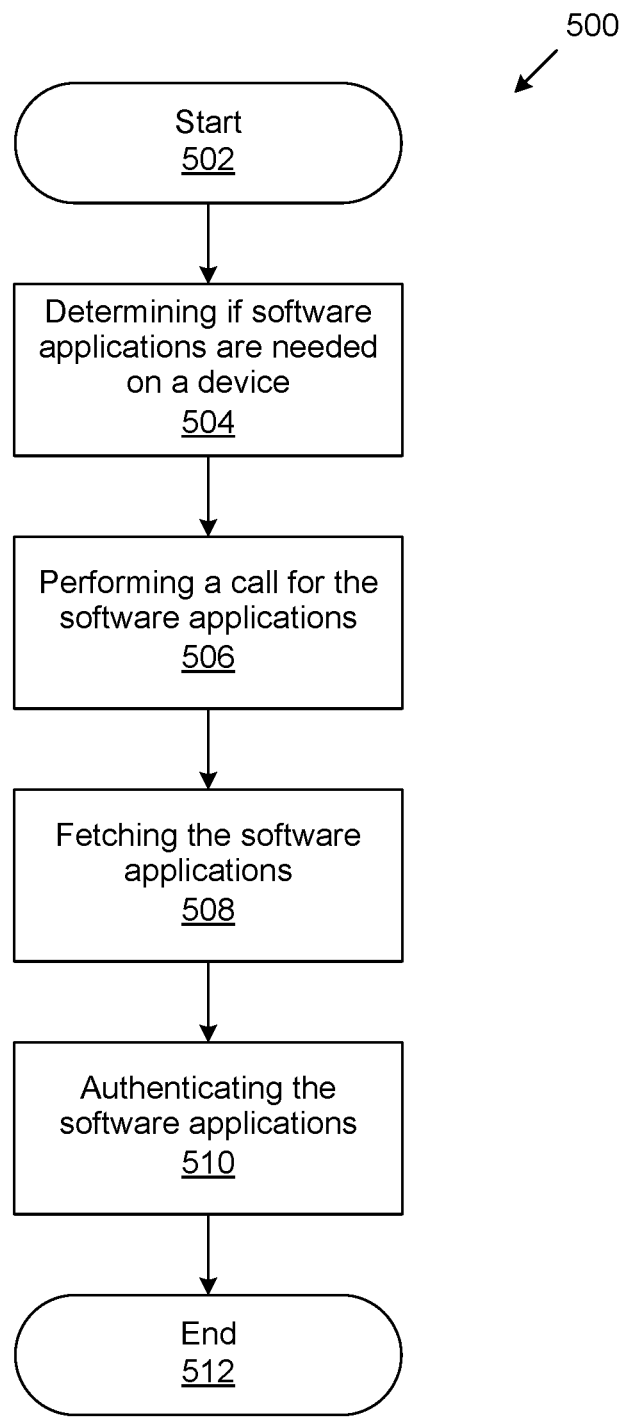
FIG. 5 is a general flowchart for management of software applications used on devices of a business entity.

FIG. 5 is a generalized flowchart 500 for management of software applications used on devices of a business entity. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502 the process 500 starts. At step 504, a determination is performed whether software applications are needed on a device. The device can be system and include multiple devices, components, components, hardware, software, applications, etc. The system or device is specific to a business entity. The business entity provides software applications for use on the system or device, directly or indirectly through third-party providers. In certain implementations, an inventory is performed as to the devices, components, components, hardware, software, applications, etc. that are supported by the business entity. At step 506, a call is performed for the software applications that are to be installed on the system or device. The software applications can be from various sources, including third-party marketplaces and directly from the business entity. At step 508, the software applications are fetched form the respective sources. In certain implementations, the fetching is performed whenever a new or updated version of the software application is available. At step 510, authentication is performed on the fetched software applications. Authentication can be performed using various methods, including a certificate or signature comparison. The authentication is performed before the installation of the software applications. At block 512, the process 500 ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for management of software applications used on a device of a business entity comprising:
    determining if software applications which are available over different platforms are needed for the device through an application interface gateway (DEAL) monitored and provided updates by a software application management system wherein the software applications are identified by identifier numbers that include #KeyDatabase information;
    analyzing inventory of components and software applications identified by part numbers specified and signed by the business entity of the device through the application interface gateway, wherein the analyzing assures that the software applications are authentic;
    identifying business entity specific components and software applications of the device by comparing the part numbers to part numbers in a key database through the application interface gateway, wherein the identifying assures that the software applications are authentic;
    generating reports as to the device and system implementing the device based on the authenticated software applications;
    performing application program interface (API) calls for needed software applications from one or more sources customized to the device;
    fetching the needed software applications from the one or more sources through communication channels established by the API calls; and
    authenticating fetched software applications prior to installing on the device.

2. The method of claim 1, wherein the determining is based on components, hardware, software, and applications specific to the business entity implemented by the device and fetching the needed software applications includes bundled software applications specific to the components, hardware, software, and applications.

3. The method of claim 1, wherein the sources include third-party provider marketplaces.

4. The method of claim 1, wherein the authenticating is performed of the fetched software applications by signature comparison, certificate comparison, or a combination of signature and certificate comparison.

5. The method of claim 1 further comprising generating a review report of the software applications installed on the device, wherein the review report includes updates over time.

6. The method of claim 1 further comprising receiving updates as to the software applications.

7. The method of claim 1 further comprising generating a customized repository of an inventory of components, hardware, software, and applications identified by part numbers specific to the business entity that implement the needed software applications, wherein an update is performed on the customized repository when changes are made to the inventory of components, hardware, software, and applications.

8. A system comprising:
    a processor;
    a data bus coupled to the processor; and a non-transitory, computer-readable storage medium embodying computer program code, the non-transitory, computer-readable storage medium being coupled to the data bus, the computer program code interacting with a plurality of computer operations for improved management of software applications used on a device of a business entity and comprising instructions executable by the processor and configured for:
        determining if software applications which are available over different platforms are needed for the device through an application interface gateway (DEAL) monitored and provided updates by a software application management system wherein the software applications are identified by identifier numbers that include #KeyDatabase information;
        analyzing inventory of components and software applications identified by part numbers specified and signed by the business entity of the device through the application interface gateway, wherein the analyzing assures that the software applications are authentic;
        identifying business entity specific components and software applications of the device by comparing the part numbers to part numbers in a key database through the application interface gateway, wherein the identifying assures that the software applications are authentic;
        generating reports as to the device and system implementing the device based on the authenticated software applications;
        performing application program interface (API) calls for needed software applications from one or more sources customized to the device;
        fetching the needed software applications from the one or more sources through communication channels established by the API calls; and
        authenticating fetched software applications prior to installing on the device.

9. The system of claim 8, wherein the determining is based on components, hardware, software, and applications specific to the business entity implemented by the device and fetching the needed software applications includes bundled software applications specific to the components, hardware, software, and applications.

10. The system of claim 8, wherein the sources include third-party provider marketplaces.

11. The system of claim 10, wherein the authenticating is performed of the fetched software applications by signature comparison, certificate comparison, or a combination of signature and certificate comparison.

12. The system of claim 8 further comprising generating a review report of the software applications installed on the device, wherein the review report includes updates over time.

13. The system of claim 8 further comprising receiving updates as to the software applications.

14. The system of claim 8 further comprising generating a customized repository of an inventory of components, hardware, software, and applications identified by part numbers specific to the business entity that implement the needed software applications, wherein an update is performed on the customized repository when changes are made to the inventory of components, hardware, software, and applications.

15. A non-transitory, computer-readable storage medium embodying computer program code, the computer program code comprising computer executable instructions configured for:
   determining if software applications which are available over different platforms are needed for a device through an application interface gateway (DEAL) monitored and provided updates by a software application management system wherein the software applications are identified by identifier numbers that include #KeyDatabase information;
   analyzing inventory of components and software applications identified by part numbers specified and signed by a business entity of the device through the application interface gateway, wherein the analyzing assures that the software applications are authentic;
   identifying business entity specific components and software applications of the device by comparing the part numbers to part numbers in a key database through the application interface gateway, wherein the identifying assures that the software applications are authentic;
   generating reports as to the device and system implementing the device based on the authenticated software applications;
   performing application program interface (API) calls for needed software applications from one or more sources customized to the device;
   fetching the needed software applications from the one or more sources through communication channels established by the API calls; and
   authenticating fetched software applications prior to installing on the device.

16. The non-transitory, computer-readable storage medium of claim 15, wherein the determining is based on components, hardware, software, and applications specific to the business entity implemented by the device and fetching the needed software applications includes bundled software applications specific to the components, hardware, software, and applications.

17. The non-transitory, computer-readable storage medium of claim 15, wherein the authenticating is performed of the fetched software applications by signature comparison, certificate comparison, or a combination of signature and certificate comparison.

18. The non-transitory, computer-readable storage medium of claim 15 further comprising generating a review report of the software applications installed on the device, wherein the review report includes updates over time.

19. The non-transitory, computer-readable storage medium of claim 15, further comprising receiving updates as to the software applications.

20. The non-transitory, computer-readable storage medium of claim 15 comprising generating a customized repository of an inventory of components, hardware, software, and applications identified by part numbers specific to the business entity that implement the needed software applications, wherein an update is performed on the customized repository when changes are made to the inventory of components, hardware, software, and applications.

\* \* \* \* \*